(12) United States Patent
Scott et al.

(10) Patent No.: US 6,193,038 B1
(45) Date of Patent: Feb. 27, 2001

(54) ONE-WAY CLUTCH AND METHOD FOR MAKING SAME

(75) Inventors: Gary B. Scott; Brice A. Pawley, both of Midland; Jeffrey J. Prout, Freeland; Stephen M. Ruth, Holly, all of MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 09/376,620

(22) Filed: Aug. 18, 1999

(51) Int. Cl.[7] .............................. F16D 11/16; B23P 15/00
(52) U.S. Cl. .............................. 192/46; 29/437; 192/69.1
(58) Field of Search ........................... 192/46, 69.1, 43.1, 192/45.1; 60/345; 29/434, 437, 446, 523, 525.01

(56) References Cited

U.S. PATENT DOCUMENTS

| Re. 29,985 | 5/1979 | Brownhill et al. . | |
|---|---|---|---|
| 3,776,335 | 12/1973 | Cadet . | |
| 3,876,047 | 4/1975 | Rist . | |
| 3,952,849 | 4/1976 | Brownhill et al. . | |
| 4,809,831 | 3/1989 | Kinoshita . | |
| 4,821,857 | 4/1989 | Groh . | |
| 5,070,976 | 12/1991 | Zlotek . | |
| 5,070,977 | 12/1991 | Lederman . | |
| 5,070,978 | 12/1991 | Pires . | |
| 5,449,057 | * 9/1995 | Frank | 192/46 |
| 5,480,013 | 1/1996 | Fujiwara et al. . | |
| 5,597,057 | * 1/1997 | Ruth et al. | 192/46 |
| 5,632,363 | 5/1997 | Kubo et al. . | |
| 5,678,668 | * 10/1997 | Sink | 192/46 |
| 5,918,715 | * 7/1999 | Ruth et al. | 192/46 |
| 5,964,331 | * 10/1999 | Reed et al. | 192/46 |

* cited by examiner

*Primary Examiner*—Rodney H. Bonck
(74) *Attorney, Agent, or Firm*—Brooks & Kushman P.C.

(57) ABSTRACT

A method for manufacturing a one-way clutch includes forming an inner plate; forming first and second outer plate members having a common axis; forming at least one strut pocket in one of the group consisting of the inner plate and the second outer plate member; forming at least one notch in the other of the group consisting of the inner plate and the second outer plate member; assembling a strut in the at least one strut pocket; inserting the inner plate between the outer plate members; and securing the outer plate members together to form a unitary outer plate assembly such that the inner plate is rotatably retained within the outer plate assembly and the strut is engageable with the at least one notch to effect one-way torque transfer between the inner plate and the outer plate assembly. The method may also include forming the second outer plate member as two pieces having mating surfaces, and interlocking the mating surfaces together. A one-way clutch manufactured by the method is also disclosed.

29 Claims, 7 Drawing Sheets

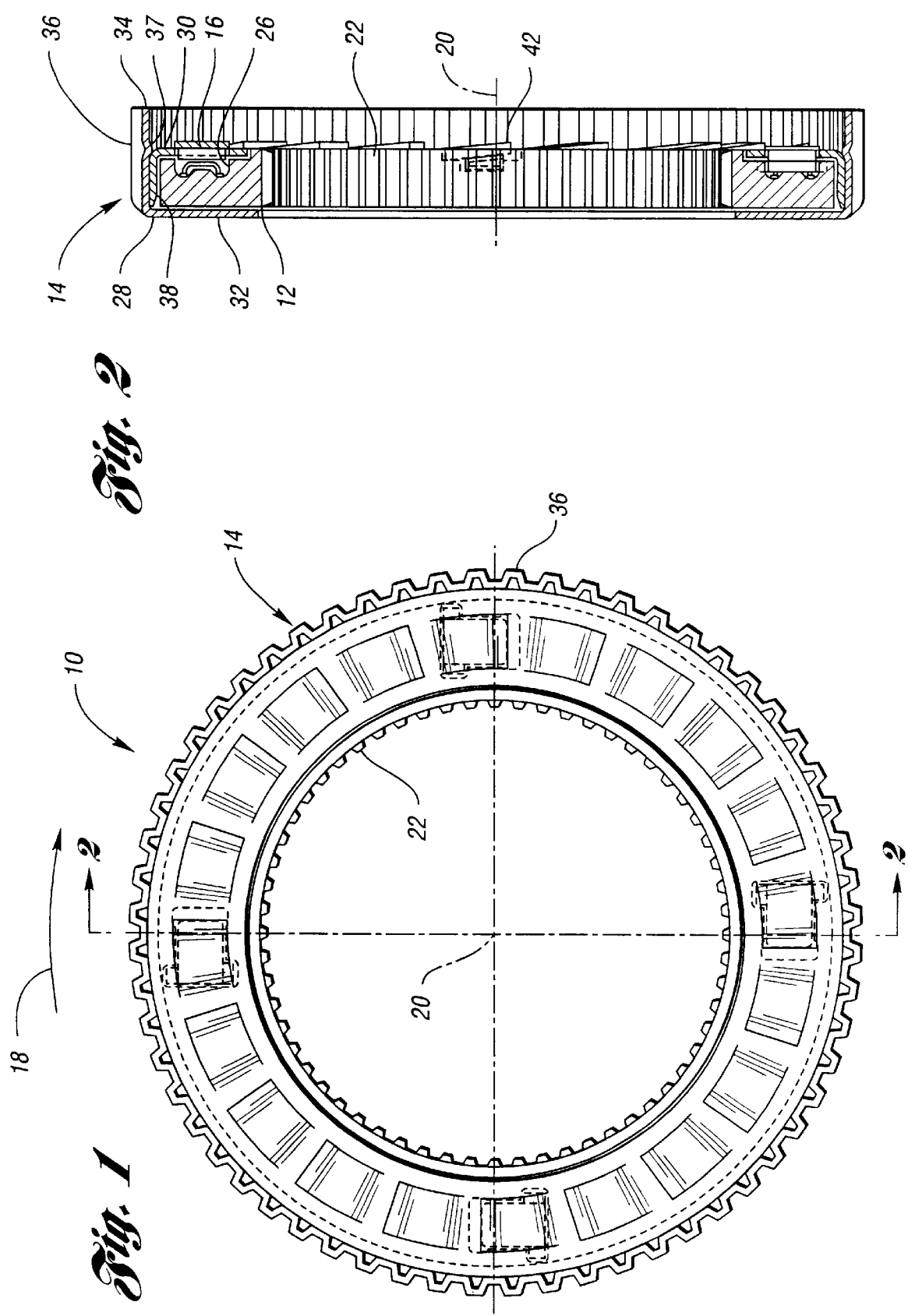

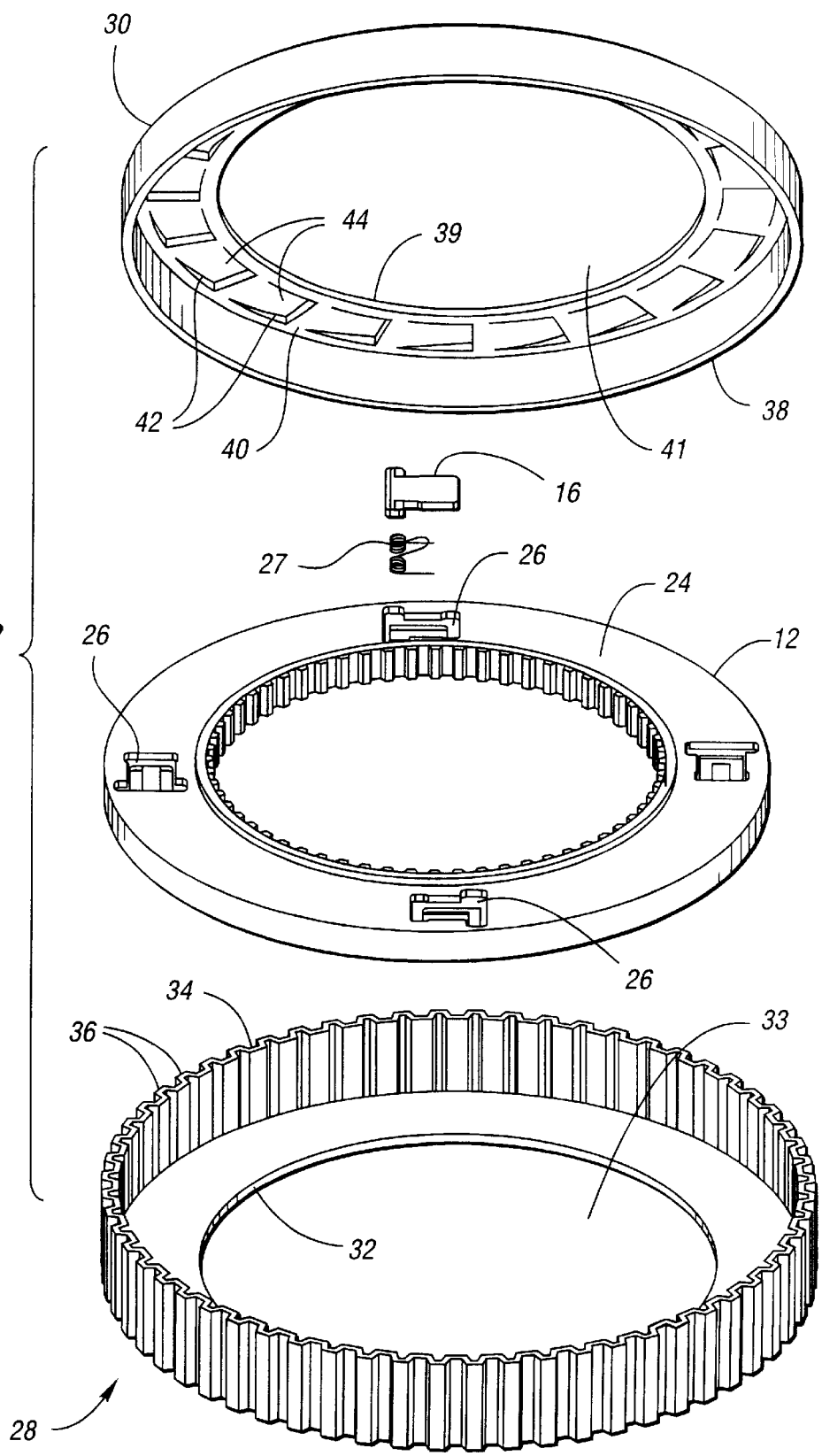

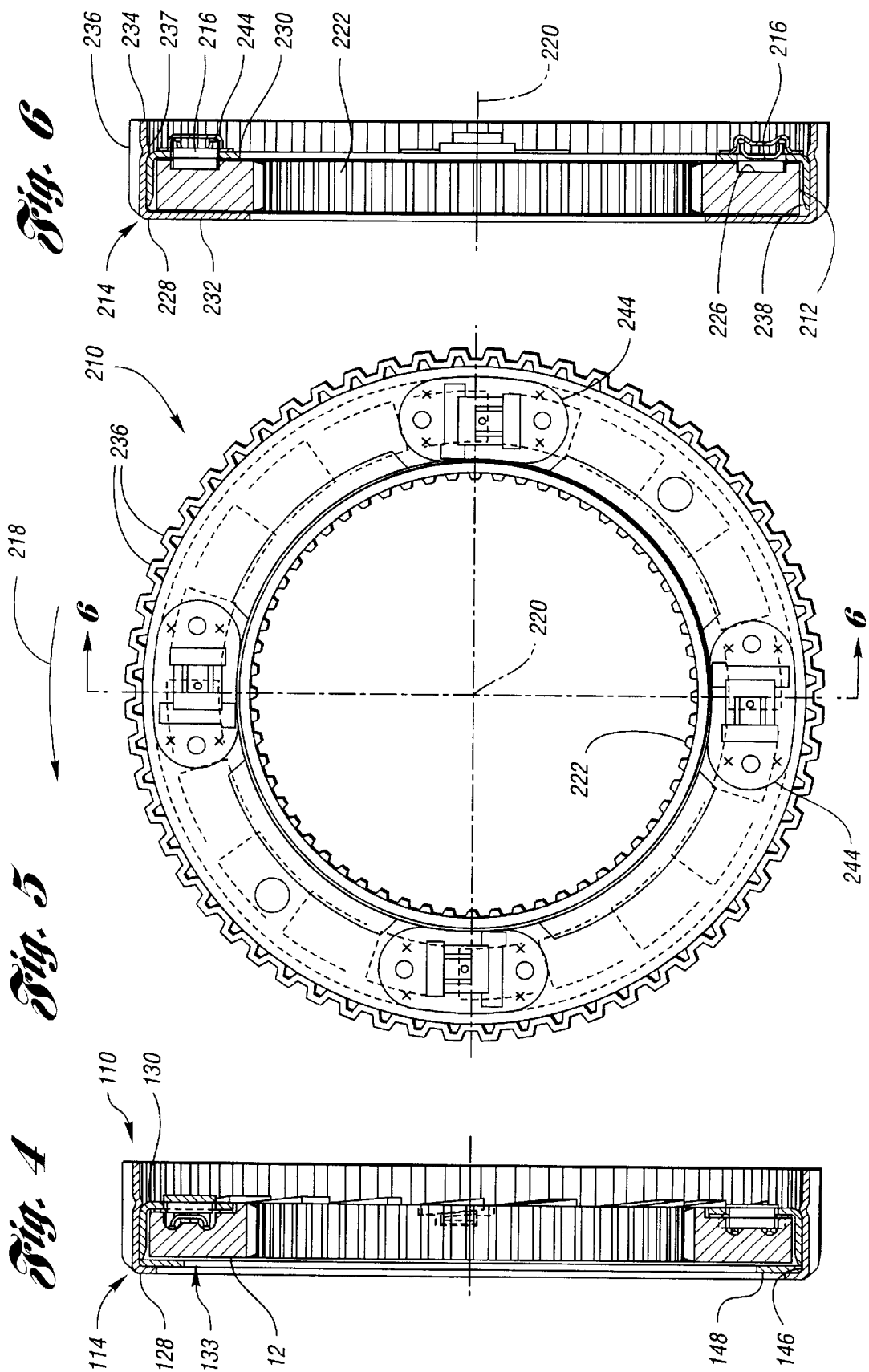

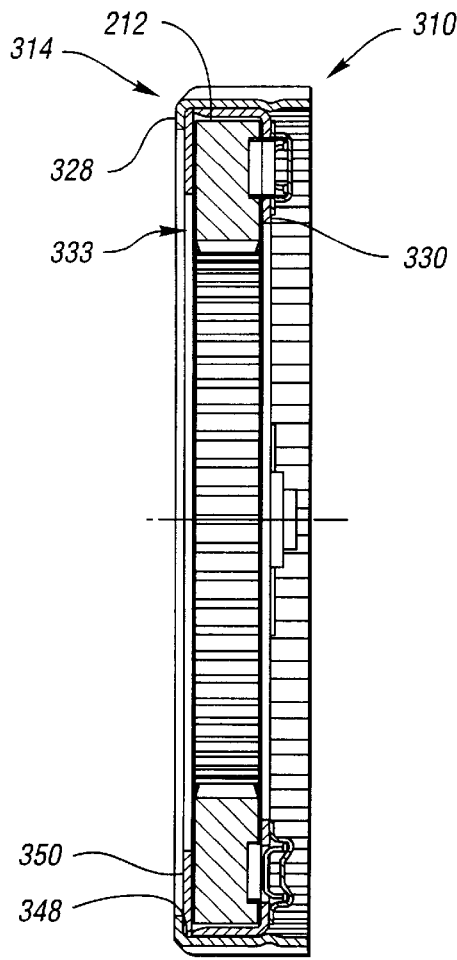

| FORMING AN INNER PLATE WITH A PLURALITY OF STRUT POCKETS |
|---|
| FORMING FIRST AND SECOND OUTER PLATE MEMBERS, EACH OF WHICH HAS AN AXIALLY EXTENDING FLANGE PORTION, THE SECOND OUTER PLATE MEMBER HAVING A PLURALITY OF NOTCHES |
| ASSEMBLING A STRUT IN EACH OF THE STRUT POCKETS |
| INSERTING THE INNER PLATE BETWEEN THE OUTER PLATE MEMBERS |
| SECURING THE OUTER PLATE MEMBERS TOGETHER TO FORM A UNITARY OUTER PLATE ASSEMBLY SUCH THAT THE FLANGE PORTION OF THE FIRST PLATE MEMBER OVERLAPS THE FLANGE PORTION OF THE SECOND OUTER PLATE MEMBER |

ONE-WAY CLUTCH AND METHOD FOR MAKING SAME

TECHNICAL FIELD

The invention relates to one-way clutches for use in mechanisms such as power transmissions, and to a method for manufacturing the same.

BACKGROUND ART

Clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial inner and outer plates having generally planar clutch faces in closely spaced, juxtaposed relationship. A plurality of recesses or pockets is formed in the face of the inner plate at angularly spaced locations about the axis, and a strut or pawl is disposed in each of the pockets. Corresponding notches are formed in the face of the outer plate and are engageable with the struts when the inner plate is rotating in a driving direction. When the direction of relative rotation of the plates is reversed, the struts disengage the notches in the outer plate, thereby allowing freewheeling motion of the inner plate with respect to the outer plate.

A typical method for making such a one-way clutch includes casting the outer plate as a single piece from materials such as aluminum and powdered metal. The casting process, however, is relatively expensive and adds significantly to the overall cost of the clutch. Furthermore, in such case, a retainer is typically required to maintain the inner plate within a flanged portion of the outer plate.

SUMMARY OF THE INVENTION

The present invention is an improved one-way clutch and a method for manufacturing the clutch efficiently and at reduced cost when compared with known methods.

The one-way clutch according to the invention comprises an outer plate assembly including first and second members secured together and having a common axis. An inner plate is disposed between the outer plate's first and second members and is rotatable relative to the first and second members about the axis thereof. One of the group consisting of the second member and the inner plate has at least one strut recess or pocket, and the other of the group consisting of the second member and the inner plate has at least one recess or notch alignable with the at least one strut pocket. The clutch further comprises a torque-transmitting strut disposed in the at least one strut pocket, the strut being engageable with the at least one notch to effect one-way torque transfer between the inner plate and the outer plate.

In one embodiment of the invention, the second member comprises first and second annular elements having mating surfaces that interlock together.

In accordance with a feature of the invention, each of the first and second members preferably has an axially extending flange portion, and the members are secured together such that the flange portions overlap each other.

The method according to the invention comprises forming an inner plate; forming first and second outer plate members having a common axis; forming at least one strut pocket in one of the group consisting of the inner plate and the second outer plate member; forming at least one notch in the other of the group consisting of the inner plate and the second outer plate member; assembling a strut in the at least one strut pocket; inserting the inner plate between the outer plate members; and securing the outer plate members together to form a unitary outer plate assembly such that the inner plate is rotatably retained within the outer plate assembly and the strut is engageable with the at least one notch to effect one-way torque transfer between the inner plate and the outer plate assembly.

The method may also include forming the second outer plate member as two annular elements having mating surfaces, and interlocking the mating surfaces together.

In accordance with a feature of the invention, the method preferably includes stamping the first and second outer plate members from sheet stock material and staking the members together to retain the inner plate therebetween. Advantageously, the inner plate is preferably retained without requiring a separate retaining device such as a weir or snap ring.

While exemplary embodiments of a one-way clutch and exemplary methods for making the same are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a front view of a one-way clutch according to the invention and showing an outer plate assembly having a plurality of notches;

FIG. 2 is a cross-sectional view of the one-way clutch taken along line 2—2 of FIG. 1 showing first and second outer plate members and an inner plate;

FIG. 3 is an exploded perspective view of the one-way clutch showing the outer plate assembly and the inner plate;

FIG. 4 is a cross-sectional view, similar to FIG. 2, of a second embodiment of a one-way clutch and showing a retaining device disposed between first and second outer plate members;

FIG. 5 is a front view of a third embodiment of a one-way clutch according to the invention and showing an outer plate assembly having a plurality of strut pocket members;

FIG. 6 is a cross-sectional view of the one-way clutch taken along line 6—6 of FIG. 5 and showing first and second outer plate members and an inner plate;

FIG. 8 is a cross-sectional view, similar to FIG. 6, of a fourth embodiment of a one-way clutch and showing a retaining device disposed between first and second outer plate members;

FIG. 12 is a flowchart of an exemplary method according to the invention.

BEST MODES FOR CARRYING OUT THE INVENTION

Figure 7:
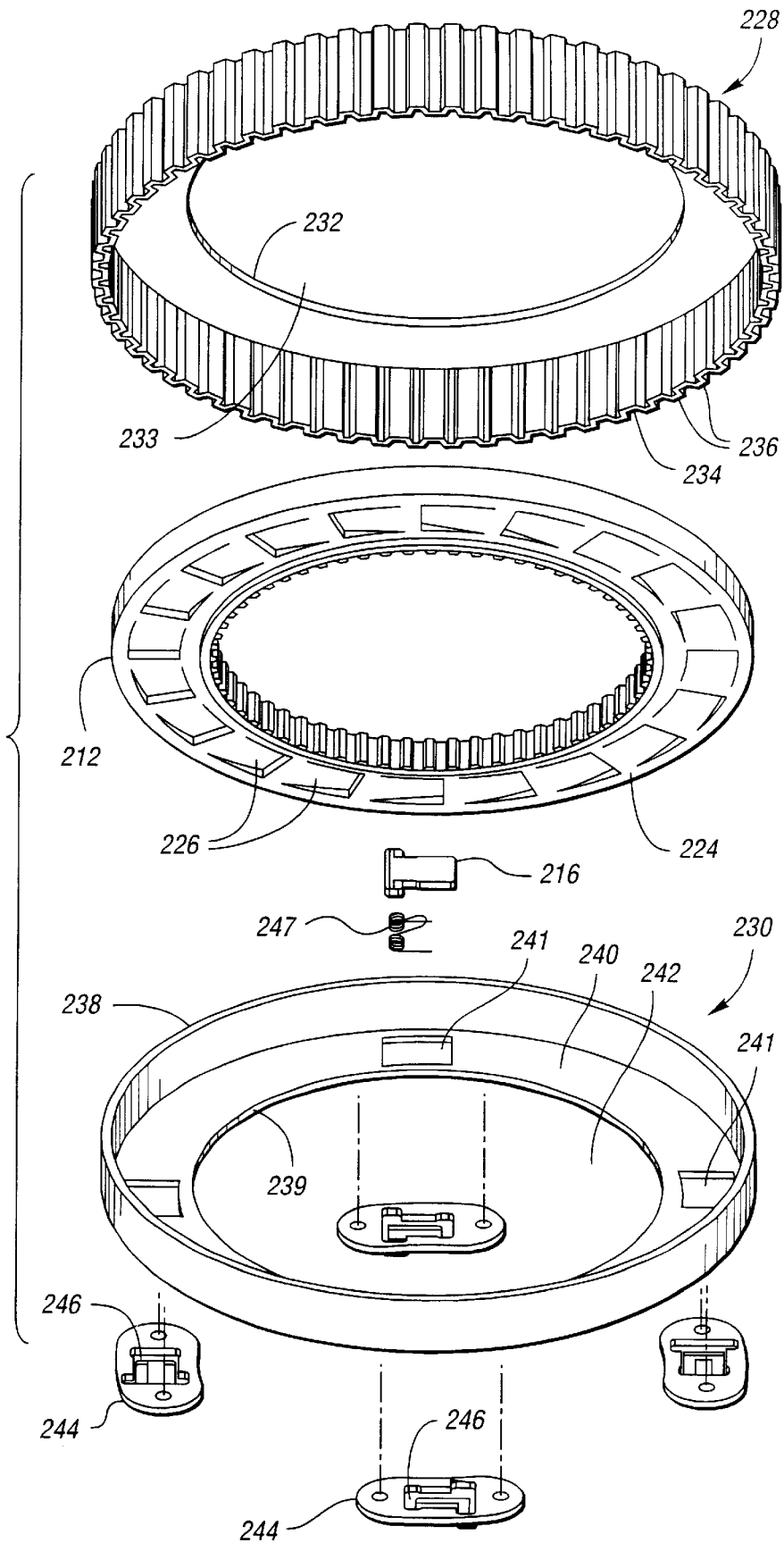
FIG. 7 is an exploded perspective view of the one-way clutch of FIG. 5 showing the outer plate assembly and the inner plate.

FIGS. 1 through 3 show a first exemplary one-way clutch 10 according to the invention for use with a motor vehicle. The clutch 10 includes a driving member or inner plate 12, a driven member or outer plate assembly 14, and a plurality of torque-transmitting struts 16 which operate to mechanically couple the inner plate 12 to the outer plate assembly 14 only when the inner plate 12 rotates in a first direction 18 about an axis 20. Alternatively, the inner plate 12 may function as the driven member and the outer plate assembly 14 may function as the driving member.

The inner plate 12 has a splined central opening 22 for receiving rotational input from a cooperating drive shaft (not shown) or other suitable arrangement. The inner plate 12 further includes a generally planar clutch face 24 having a plurality of strut pockets 26 disposed at angularly spaced positions about the axis 20. One torque-transmitting strut 16 is disposed in each of the pockets 26. A spring 27 is preferably disposed beneath each strut 16 for urging a free end of the strut out of its respective pocket 26.

The outer plate assembly 14 includes first and second members 28 and 30, respectively, which are secured together so as to sufficiently retain the inner plate 12 therebetween. The first member 28 has a generally-radially-extending portion 32 having a generally circular aperture 33 extending therethrough. The portion 32 preferably extends sufficiently radially inwardly so as to sufficiently retain lubricating fluid within the clutch 10. The first member 28 also has a generally-axially-extending flange portion 34. A plurality of splines or ridges 36 extend radially from the flange portion 34, and are engageable with an external arrangement (not shown) for transmitting torque to the external arrangement. Alternatively, other mechanisms such as sprockets, keyed shafts or any other suitable configuration or mechanism may be used for coupling the clutch 10 to torque input and output arrangements. The flange portion 34 also preferably has one or more projections 37 which engage the second member 30 for securing the members 28 and 30 together.

The second member 30 has a generally-axially-extending flange portion 38 that nests within the flange portion 34, and a generally radially extending portion 39 having a generally planar clutch face 40 and a generally circular aperture 41 extending therethrough. A plurality of tabs 42 are disposed at angularly spaced positions about the axis 20, and the tabs define a plurality of recesses or notches 44 in the clutch face 40. The notches 44 are alignable with the strut pockets 26, and are selectively engageable with the struts 16 to transmit torque between the inner plate 12 and the outer plate assembly 14 when the inner plate is rotating relative to the outer plate assembly 14 in the first direction 18 about the axis 20.

FIG. 4 shows a second embodiment 110 of a one-way clutch including the inner plate 12 and an outer plate assembly 114 having first and second members 128 and 130. The members 128 and 130 are similar to the members 28 and 30 described with respect to the one-way clutch 10, except that the first member 128 has a relatively larger aperture 133 extending therethrough. Furthermore, the members 128 and 130 are secured together so as to form an annular groove 146. A retaining device 148, such as a weir or snap ring, is disposed in the groove 146 for retaining the inner plate 12 within the outer plate assembly 114.

FIGS. 5 through 7 show a third embodiment 210 of a one-way clutch including a driving member or inner plate 212, a driven member or outer plate assembly 214, and a plurality of torque-transmitting struts 216 which operate to mechanically couple the inner plate to the outer plate assembly only when the inner plate rotates in a first direction 218 about an axis 220. Alternatively, the inner plate 212 may function as the driven member and the outer plate assembly 214 may function as the driving member.

The inner plate 212 has a splined central opening 222 for receiving rotational input from a cooperating drive shaft (not shown) or other suitable arrangement. The inner plate 212 further includes a generally planar clutch face 224 having a plurality of recesses or notches 226 disposed at angularly spaced positions about the axis 220.

The outer plate assembly 214 includes first and second members 228 and 230, respectively, which are secured together so as to sufficiently retain the inner plate 212 therebetween. The first member 228 has a generally-radially-extending portion 232 having a generally circular aperture 233 extending therethrough. The portion 232 preferably extends sufficiently radially inwardly so as to sufficiently retain lubricating fluid within the clutch 210. The first member 228 also has a generally-axially-extending flange portion 234. A plurality of splines or ridges 236 extend radially from the flange portion 234, and are engageable with an output arrangement (not shown) for transmitting torque to the output arrangement. Alternatively, other mechanisms such as sprockets, keyed shafts or any other suitable configuration or mechanism may be used for coupling the clutch 210 to torque input and output arrangements. The flange portion 234 also preferably has a projection 237 which engages the second member 230 for securing the members 228 and 230 together.

The second member 230 has a generally-axially-extending flange portion 238 that nests within the flange portion 234 of the first member 228, and a generally-radially-extending portion 239. The portion 239 has a generally planar clutch face 240, a plurality of openings 241 disposed at angularly spaced positions about the axis 220, and a generally circular aperture 242 extending therethrough. A plurality of strut pocket members 244, each of which defines a strut pocket 246, are preferably welded to the second member 230 such that each strut pocket member is aligned with a corresponding opening 241. Alternatively, the strut pocket members 244 may be secured to the second member 230 in any other suitable manner. One torque-transmitting strut 216 is disposed in each strut pocket 246, and a spring 247 is preferably disposed beneath each strut 216 for urging a free end of the strut out of its respective pocket. When the inner plate 212 is rotating relative to the outer plate assembly 214 in the first direction 218 about the axis 220, the free end of at least one of the struts 216 engages at least one of the notches 226 to mechanically couple the inner plate 212 with the outer plate assembly 214.

FIG. 8 shows a fourth embodiment 310 of a one-way clutch including the inner plate 212 and an outer plate assembly 314 having first and second members 328 and 330. The members 328 and 330 are similar to the members 228 and 230 described with respect to the one-way clutch 210, except that the first member 328 has a relatively larger aperture 333 extending therethrough. Furthermore, the members 328 and 330 are secured together so as to form an annular groove 348. A retaining device 350, such as a weir or snap ring, is disposed in the groove 348 for retaining the inner plate 212 within the outer plate assembly 314.

Figures 9, 10:
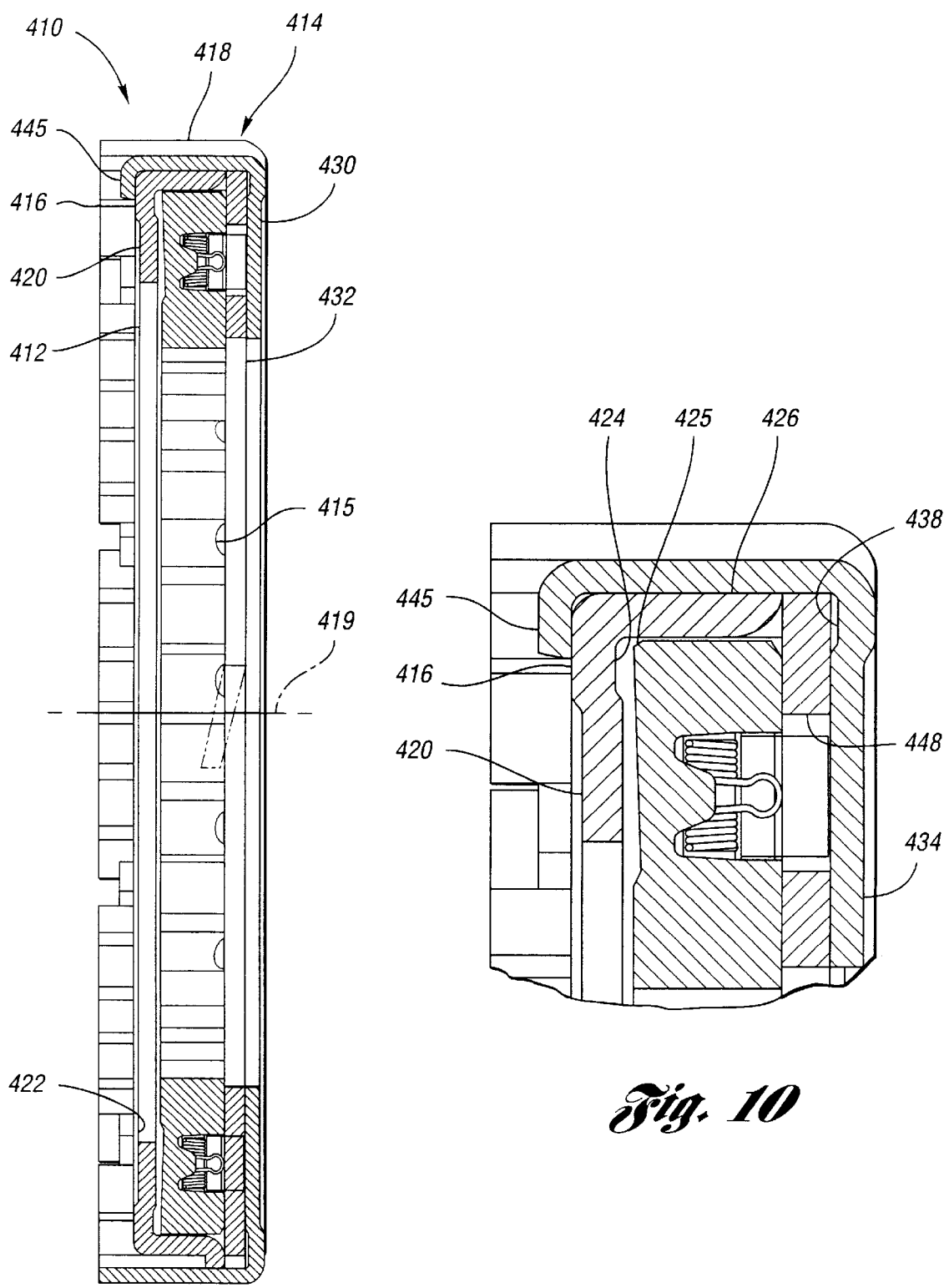
FIG. 9 is a cross-sectional view, similar to FIG. 2, of a fifth embodiment of a one-way clutch and showing first and second outer plate members, wherein the second outer plate member includes two annular elements having mating surfaces that are interlocked together.
FIG. 10 is an enlarged fragmentary view of a portion of FIG. 9.
Figure 11:
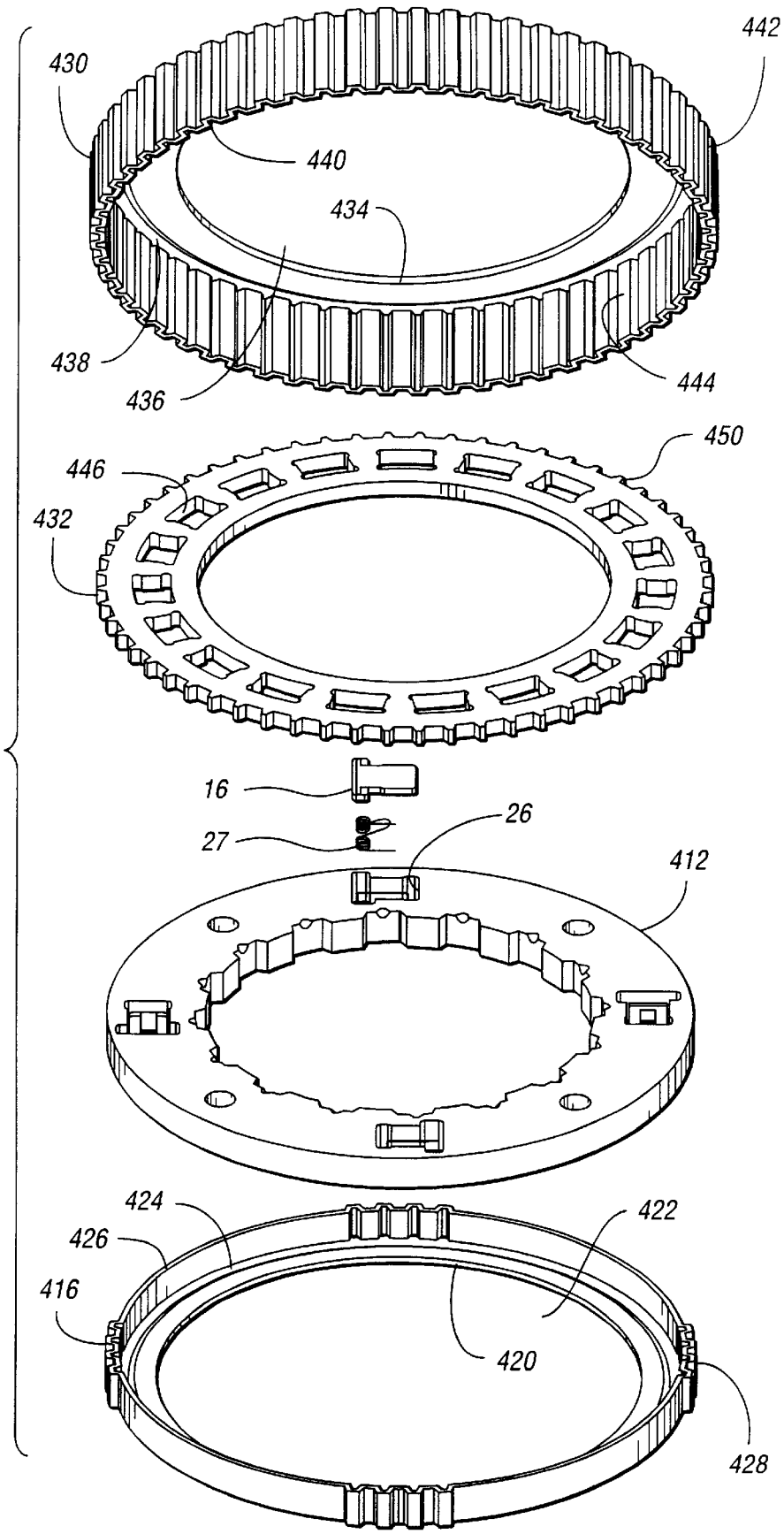
FIG. 11 is an exploded perspective view of the one-way clutch of FIG. 9.

FIGS. 9–11 show a fifth embodiment 410 of a one-way clutch including an inner plate 412 and an outer plate assembly 414. The inner plate 412 includes all of the features of the inner plate 12 of the first exemplary clutch 10, and further includes a plurality of recesses 415 for receiving oil or other lubricating fluid. The recesses 415 also direct the oil or other lubricating fluid between the inner plate 412 and the outer plate assembly 414 to provide lubrication for the one-way clutch 410 during an overrunning condition.

The outer plate assembly 414 includes first and second members 416 and 418, respectively, which have a common axis 419. The members 416 and 418 are secured together so as to sufficiently retain the inner plate 12 therebetween. The first member 416 has a generally-radially-extending portion 420 having a generally circular aperture 422 extending therethrough. The portion 420 preferably has a recess 424 so as to avoid interference between an edge 425 of the inner plate 12 and the first member 416. The first member 416 also comprises a generally axially extending flange portion 426 that has a plurality of splines or ridges 428.

The second member 418 includes first and second annular elements 430 and 432, respectively, that are interlocked together. The first element 430 has a generally-radially-extending portion 434 having a generally circular aperture 436 extending therethrough. The portion 434 preferably has a recess 438 so as to allow the second element 432 to be positioned directly adjacent the portion 434. The first element 430 also comprises a generally-axially-extending flange portion 440 that is configured to surround the flange portion 426, and has first and second splined surfaces 442 and 444, respectively. The first splined surface 442 is engageable with an external arrangement (not shown) for transmitting torque to the external arrangement. The second splined surface 444 mates with the ridges 428 of the first member 416 such that the first and second members 416 and 418 are rotatable together. The flange portion 440 also preferably comprises a plurality of tabs 445 that are bent over the first member 416 to secure the first and second members 416 and 418 together.

The second element 432 is preferably generally planar and has a plurality of apertures 446 disposed at angularly spaced positions about the axis 419. The apertures 446 cooperate with the portion 434 to define a plurality of recesses or notches 448 that provide a similar function as the notches 44 of the first exemplary clutch 10. The second element 432 also has a plurality of splines or ridges 450 that mate with the second splined surface 444 so as to interlock the first and second elements 430 and 432 together. Preferably, the ridges 450 interferingly engage the second splined surface 444 to secure the first and second elements 430 and 432 together. Alternatively or supplementally, the first and second elements 430 and 432 may be secured together in any suitable manner such as with fasteners or by welding the elements 430 and 432 together.

FIG. 12 is a flowchart illustrating an exemplary method according to the invention for making the first exemplary clutch 10 of FIGS. 1 through 3. While the method contemplates forming the inner plate 12 in any suitable manner, the inner plate 12 is preferably formed of powdered metal. This forming process results in accurately-formed strut pockets 26 within the clutch face 24. The first and second members 28 and 30 are preferably stamped from sheet stock material using a progressive punch and die arrangement (not shown). By way of example only, suitable sheet stock material includes cold-drawn or cold-rolled wire of SAE 1010 steel or spheroidized and annealed SAE 1065 steel. Alternatively, the members 28 and 30 may be injection molded using phenolic resin, cast with aluminum, or otherwise formed in any suitable manner.

With respect to the first member 28, the method includes advancing stock material having an approximate width of 7 inches to a first die station, and drawing or stamping the stock material at the first die station to form the annular portion 32, the flange portion 34 and the ridges 36. The stock material is then advanced to a second die station where it is blanked or otherwise stamped to form the aperture 33 in the annular portion 32, thereby forming the first member 28. Alternatively, the ridges 36 may be formed by a spline roller before or after stamping the stock material to form the aperture 33. The first member 28 preferably does not require any heat treating after the stamping steps.

With respect to the second member 30, the method includes advancing stock material to a third die station, and drawing or stamping the stock material at the third die station to form the flange portion 38 and the clutch face 40. The stock material is then advanced to a fourth die station where it is lanced or otherwise stamped to form the tabs 42 which define the notches 44. Next, the stock material is advanced to a fifth station where it is blanked or otherwise stamped to form the aperture 41, thereby forming the second member 30. Alternatively, the aperture 41 may be formed in the stock material prior to forming the tabs 42. Additionally, the second member 30 is preferably heat treated to increase strength and wear resistance.

Next, the struts 16 and springs 27 are assembled in the pockets 26 of the inner plate 12. The inner plate 12 is then positioned between the first and second members 28 and 30 such that the clutch face 24 is adjacent the clutch face 40. The second member 30 is then nested within the first member 28 such that the flange portion 34 overlaps the flange portion 38. Next, the members 28 and 30 are secured together to sufficiently retain the inner plate 12 therebetween, without requiring a separate retainer. While the method contemplates securing the members 28 and 30 together in any suitable manner, the members are preferably cam staked together. During the cam-staking process, the projections 37 are formed in the flange portion 34 of the first member 28. The projections 37 engage the second member 30, as shown in FIG. 2, to secure the members 28 and 30 together. Alternatively or supplementally, the members 28 and 30 may be welded together.

With respect to the one-way clutch 110 of FIG. 4, the members 128 and 130 may be secured together to form the outer plate assembly 114 prior to positioning the inner plate 12 therebetween. The inner plate 12 is then inserted through the aperture 133 and positioned between the members 128 and 130. Next, the retaining device 148 is inserted into the groove 146 to retain the inner plate 12 between the members 128 and 130.

The method for manufacturing the one-way clutch 210 of FIGS. 5 through 7 is similar to the method for manufacturing the clutch 10, except that the inner plate 212 is formed with notches 226 while the outer plate assembly 214 is formed with strut pockets 246. The inner plate 212 is preferably formed of powdered metal, but it may be formed in any manner known to those skilled in the art. The first and second members 228 and 230 of the outer plate assembly 214, and the strut pocket members 244 are each preferably stamped from sheet stock material using a progressive punch and die arrangement (not shown). Alternatively, the first and second members 228 and 230 and the strut pocket members 244 may be injection molded using phenolic resin, cast with aluminum, or otherwise formed in any manner known to those skilled in the art. During the stamping process, the second member 230 is formed with the plurality of openings 241, as well as the other previously described features, and the strut pocket members 244 are formed so as to define the strut pockets 246.

Next, the strut pocket members 244 are preferably welded to the second member 230 such that each strut pocket member is properly aligned with a corresponding opening 241. Alternatively, the strut pocket members 244 may be secured to the second member 230 in any suitable manner. The struts 216 and springs 247 are then assembled in the pockets 246. Next, the inner plate 212 is positioned between the first and second members 228 and 230 such that the clutch face 224 is adjacent the clutch face 240. The second member 230 is then nested within the first member 228 such that the flange portion 234 overlaps the flange portion 238. Next, the members 228 and 230 are secured together to sufficiently retain the inner plate 212 therebetween, without requiring a separate retaining device. While the method contemplates securing the members 228 and 230 together in any suitable manner, the members are preferably cam staked together. During the cam staking process, the projection 237 is formed in the flange portion 234 of the first member 228. The projection 237 engages the second member 230, as shown in FIG. 6, to secure the members 228 and 230 together.

With respect to the one-way clutch 310 of FIG. 8, the members 328 and 330 may be secured together to form the outer plate assembly 314 prior to positioning the inner plate 212 therebetween. The inner plate 212 is then inserted through the aperture 233 and positioned between the members 328 and 330. Next, the retaining device 350 is inserted into the groove 348 to retain the inner plate 212 between the members 328 and 330.

The method of forming the one-way clutch 410 of FIGS. 9–11 is similar to the method of forming the first exemplary clutch 10. Similar to the inner plate 12, the inner plate 412 is preferably formed of powdered metal, but it may be formed in any suitable manner. The first member 416 and the first and second elements 430 and 432 of the second member 418 are preferably stamped from sheet stock material using a progressive punch and die arrangement. Alternatively, the first and second members 416 and 418 may be injection molded using phenolic resin, cast with aluminum, or otherwise formed in any suitable manner.

Next, the first member 416 is mounted on an assembly fixture (not shown), and the inner plate 412 is nested within the first member 416. The springs 27 and struts 16 are then installed in the strut pockets 26 of the inner plate 412. Next, the second element 432 is inserted into the first element 430 such that the ridges 450 interferingly engage the second splined surface 444 of the first element 430, to thereby form the second member 418. The second member 418 is then placed over the first member 416, and the members 416 and 418 are secured together to sufficiently retain the inner plate 412 therebetween. While the method contemplates securing the members 416 and 418 together in any suitable manner, the members are preferably cam staked together. During the cam-staking process, the tabs 445 are formed in the flange portion 440 of the first piece 430, and the tabs 445 are bent over the first member 416 as shown in FIG. 9.

Because the method according to the invention preferably involves stamping the outer plate assembly from sheet stock material, the one-way clutch can be manufactured in accordance with the invention more cost-effectively than with known methods. Furthermore, because the first and second outer plate members are preferably secured together so as to retain the inner plate therebetween, a separate retainer is not required.

The invention has been described in an illustrative manner, and it is to be understood that the terminology which has been used is intended to be in the nature of words of description rather than of limitation. Obviously, many modifications and variations of the present invention are possible in light of the above teachings. For example, the inner plate in any of the above described embodiments may also be stamped from sheet stock material in a manner similar to that described with respect to the outer plate assemblies. As another example, the flange portions of the first or second members need not be continuous, especially if retention of a lubricant is not a requirement or a consideration. It is, therefore, to be understood that within the scope of the appended claims, the invention may be practiced otherwise than as specifically described.

What is claimed is:

1. A one-way clutch comprising:
    an outer plate assembly including first and second members having a common central axis, each of the members having an oppositely axially extending flange portion, the members being secured together such that the flange portions overlap each other:
    an inner plate disposed between the first and second members;
    wherein one of the group consisting of the second member and the inner plate has at least one strut pocket, and the other of the group consisting of the second member and the inner plate has at least one notch alignable with the at least one strut pocket; and
    a torque-transmitting strut disposed in the at least one strut pocket, the strut being engageable with the at least one notch to effect one-way torque transfer between the inner plate and the outer plate assembly.

2. The one-way clutch of claim 1 wherein the second member comprises first and second annular elements having mating surfaces that interlock together.

3. The one-way clutch of claim 1 wherein the second member includes the at least one strut pocket and the inner plate includes the at least one notch.

4. The one-way clutch of claim 3 wherein the at least one strut pocket comprises a strut pocket member secured to the second member.

5. The one-way clutch of claim 1 wherein the first member has an annular groove.

6. The one-way clutch of claim 5 further comprising a retaining device disposed in the groove.

7. A one-way clutch comprising:
    first and second annular members stamped from sheet stock material and having a common central axis, the second annular member having a plurality of openings disposed at angularly spaced positions about the axis, each of the annular members having an axially extending flange portion, the annular members being staked together to form a unitary outer plate assembly such that the flange portion of one of the annular members overlaps the flange portion of the other annular member;
    a plurality of strut pocket members secured to the second annular member such that the strut pocket members are aligned with the openings;

an inner plate sufficiently rotatably retained within the outer plate assembly and having a plurality of notches alignable with the strut pocket members; and a plurality of torque-transmitting struts disposed in the strut pocket members, the struts being selectively engageable with the notches to effect one-way torque transfer between the inner plate and the outer plate assembly.

8. A one-way clutch comprising:

first and second annular members stamped from sheet stock material and having a common central axis, the second annular member having a plurality of notches disposed at angularly spaced positions about the axis, each of the members having an axially extending flange portion, the annular members being staked together to form a unitary outer plate assembly such that the flange portion of one of the annular members overlaps the flange portion of the other annular member;

an inner plate sufficiently rotatably retained within the outer plate assembly and having a plurality of strut pockets alignable with the notches; and a plurality of torque-transmitting struts disposed in the strut pockets, the struts being selectively engageable with the notches to effect one-way torque transfer between the inner plate and the outer plate assembly.

9. The one way-clutch of claim 8 wherein the second annular member comprises first and second annular elements having mating surfaces that are interlock together.

10. An outer plate assembly for use with an inner plate of a planar one-way clutch, the outer plate assembly comprising:

first and second outer plate members that are securable together for rotatably retaining the inner plate therebetween, one of the members having one of the group consisting of a strut pocket and a notch, each of the members having an oppositely axially extending flange portion, wherein when the members are secured together, the flange portions overlap each other.

11. A method for manufacturing a one-way clutch comprising:

forming an inner plate, forming first and second outer plate members having a common central axis, forming at least one strut pocket in one of the group consisting of the inner plate and the second outer plate member, forming at least one notch in the other of the group consisting of the inner plate and the second outer plate member, assembling a strut in the at least one strut pocket, inserting the inner plate between the outer plate members, and securing the outer plate members together to form a unitary outer plate assembly such that the inner plate is rotatably retained within the outer plate assembly and the strut is engageable with the at least one notch to effect one-way torque transfer between the inner plate and outer plate assembly.

12. The method of claim 11 wherein forming first and second outer plate members comprises forming the second outer plate member as two annular elements having mating surfaces, and wherein the method further includes interlocking together the mating surfaces.

13. The method of claim 11 further comprising:

forming an axially extending flange portion on at least one of the outer plate members, and overlapping the other outer plate member with the flange portion of the at least one outer plate member.

14. The method of claim 11 further comprising:

forming an axially extending flange portion on each of the outer plate members, and overlapping the flange portion of one of the outer plate members with the flange portion of the other outer plate member.

15. The method of claim 11 further comprising:

forming a groove in the outer plate assembly, and inserting a retaining device into the groove for retaining the inner plate between the outer plate members.

16. The method of claim 11 wherein forming the at least one strut pocket includes forming at least one strut pocket member and securing the strut pocket member to the second outer plate member.

17. The method of claim 11 wherein forming the outer plate members comprises stamping the outer plate members from sheet stock material.

18. The method of claim 11 wherein forming the outer plate members comprises injection molding the outer plate members.

19. The method of claim 11 wherein forming the outer plate members comprises casting the outer plate members in a mold.

20. The method of claim 11 wherein securing the outer plate members together is performed before inserting the inner plate between the outer plate members.

21. The method of claim 11 wherein securing the outer plate members together includes cam staking the outer plate members together.

22. A method for manufacturing a one-way clutch comprising:

forming an inner plate with a plurality of notches;

stamping first and second outer plate members having a common central axis from sheet stock material such that an axially extending flange portion is formed on each of the outer plate members and a plurality of openings is formed in the second outer plate member;

stamping a plurality of strut pocket members from sheet stock material;

securing the strut pocket members to the second outer plate member such that the strut pocket members are aligned with the openings;

assembling struts in the strut pocket members;

positioning the inner plate between the outer plate members;

inserting the flange portion of one of the outer plate members within the flange portion of the other outer plate member; and staking the outer plate members together to sufficiently retain the inner plate therebetween, such that the struts are selectively engageable with the notches to effect one-way torque transfer between the inner plate and the outer plate members.

23. A method for manufacturing a one-way clutch comprising:

forming an inner plate with a plurality of strut pockets;

stamping first and second outer plate members having a common central axis from sheet stock material such that an axially extending flange portion is formed in each of the outer plate members and a plurality of tabs is formed in the second outer plate member, each of the tabs defining a notch in the second outer plate member;

assembling struts in the strut pockets;

positioning the inner plate between the outer plate members;

inserting the flange portion of one of the outer plate members within the flange portion of the other outer plate member; and staking the outer plate members together to sufficiently rotatably retain the inner plate therebetween, such that the struts are selectively engageable with the notches to effect one-way torque transfer between the inner plate and the outer plate members.

24. A method for manufacturing a one-way clutch comprising:

forming an inner plate with a plurality of strut pockets;

stamping a first outer plate member from sheet stock material such that a first axially extending flange portion is formed in the first outer plate member;

stamping first and second annular elements from sheet stock material such that mating surfaces are formed in the elements, a second axially extending flange portion is formed in the first element, and a plurality of apertures is formed in the second element;

interlocking the first and second elements together to form a second outer plate member such that the apertures of the second element cooperate with the first element to define a plurality of notches;

assembling struts in the strut pockets;

positioning the inner plate between the outer plate members;

inserting one of the first and second flange portions within the other of the first and second flange portions; and staking the outer plate members together to sufficiently rotatably retain the inner plate therebetween, such that the struts are selectively engageable with the notches to effect one-way torque transfer between the inner plate and the outer plate members.

25. A one-way clutch comprising:

an outer plate assembly including first and second members secured together and having a common central axis, the second member including first and second annular elements having mating surfaces that interlock together;

an inner plate disposed between the first and second members;

wherein one of the group consisting of the second member and the inner plate has at least one strut pocket, and the other of the group consisting of the second member and the inner plate has at least one notch alignable with the at least one strut pocket; and a torque-transmitting strut disposed in the at least one strut pocket, the strut being engageable with the at least one notch to effect one-way torque transfer between the inner plate and the outer plate assembly.

26. A one-way clutch comprising:

an outer plate assembly including first and second members secured together and having a common central axis;

a strut pocket member secured to one of the members and defining a strut pocket;

an inner plate disposed between the first and second members and having at least one notch alignable with the strut pocket; and a torque-transmitting strut disposed in the strut pocket, the strut being engageable with the at least one notch to effect one-way torque transfer between the inner plate and the outer plate assembly.

27. The one-way clutch of claim 26 further comprising a plurality of strut pocket members secured to the second member, each strut pocket member defining a strut pocket, and a plurality of torque-transmitting struts disposed in the strut pockets, wherein the inner plate includes a plurality of notches alignable with the strut pockets, and wherein the struts are selectively engageable with the notches to effect one-way torque transfer between the inner plate and the outer plate assembly.

28. A one-way clutch comprising:

an outer plate assembly including first and second members secured together and having a common central axis, the first and second members cooperating to define an annular groove;

an inner plate disposed between the first and second members;

wherein one of the group consisting of the second member and the inner plate has at least one strut pocket, and the other of the group consisting of the second member and the inner plate has at least one notch alignable with the at least one strut pocket;

a retaining device disposed in the groove; and a torque-transmitting strut disposed in the at least one strut pocket, the strut being engageable with the at least one notch to effect one-way torque transfer between the inner plate and the outer plate assembly.

29. The one-way clutch of claim 28 wherein each of the first and second members has an oppositely axially extending flange portion, and the members are secured together such that the flange portions overlap each other.

* * * * *